(12) United States Patent
Dolbeau

(10) Patent No.: US 12,346,254 B2
(45) Date of Patent: Jul. 1, 2025

(54) HIGH-PERFORMANCE COMPUTING SYSTEM

(71) Applicant: SIPEARL, Maisons-Laffitte (FR)

(72) Inventor: Romain Dolbeau, Rennes (FR)

(73) Assignee: SIPEARL, Maisons-Lafitte (FR)

( * ) Notice: Subject to any disclaimer, the term of this patent is extended or adjusted under 35 U.S.C. 154(b) by 0 days.

(21) Appl. No.: 18/018,801

(22) PCT Filed: Jul. 29, 2021

(86) PCT No.: PCT/EP2021/071342
§ 371 (c)(1),
(2) Date: Jan. 30, 2023

(87) PCT Pub. No.: WO2022/023500
PCT Pub. Date: Feb. 3, 2022

(65) Prior Publication Data
US 2023/0325315 A1  Oct. 12, 2023

(30) Foreign Application Priority Data

Jul. 30, 2020 (EP) ..................................... 20188737

(51) Int. Cl.
*G06F 12/0813* (2016.01)
*G06F 12/0815* (2016.01)
*G06F 15/173* (2006.01)

(52) U.S. Cl.
CPC ...... *G06F 12/0813* (2013.01); *G06F 12/0815* (2013.01); *G06F 15/17368* (2013.01)

(58) Field of Classification Search
CPC .......................... G06F 12/0813; G06F 12/0815
See application file for complete search history.

(56) References Cited

U.S. PATENT DOCUMENTS 9,916,259 B1 * 3/2018 Nordin ................ G06F 12/0891
2009/0222654 A1 * 9/2009 Hum ...................... G06F 1/3203
713/323

(Continued)

OTHER PUBLICATIONS

ARM, big.LITTLE Technology: The Future of Mobile, 2013 (Year: 2013).*

(Continued)

*Primary Examiner* — Ryan Bertram
(74) *Attorney, Agent, or Firm* — The Jansson Firm; Pehr B. Jansson

(57) ABSTRACT

A high-performance computing system having at least one computational group of at least one core, each computational group being associated with a computational memory, arranged to form a computational resource being utilized for performing computations, a concierge module with at least one concierge group of at least one core associated with a concierge memory arranged to form a reserved support resource being utilized for performing support functions to said computational resource. The computational resource is coupled to the concierge module through a cache coherent interconnection to maintain uniformity of shared resource data that are stored in the computational memory and concierge memory so that the high-performance computing system is functionally transparent to a software code runs on the computational group, and the cores in the computation and concierge groups are interchangeable for the software code such that the cores are used for performing any one of computations or support functions, and the cores use any one of the computational and concierge memory.

11 Claims, 7 Drawing Sheets

(56) References Cited

U.S. PATENT DOCUMENTS

| | | | |
|---|---|---|---|
| 2014/0115268 A1 | 4/2014 | Beers et al. | |
| 2016/0062798 A1* | 3/2016 | Lee | G06F 9/5094 |
| | | | 718/104 |
| 2017/0109278 A1* | 4/2017 | Yamaguchi | G06F 12/0842 |
| 2018/0189239 A1* | 7/2018 | Nurvitadhi | G06F 9/3001 |
| 2018/0189638 A1* | 7/2018 | Nurvitadhi | G06N 3/063 |
| 2019/0243700 A1 | 8/2019 | Brewer | |
| 2020/0136943 A1* | 4/2020 | Banyai | H04L 67/1097 |
| 2020/0151005 A1* | 5/2020 | Park | G06F 9/4881 |
| 2020/0218684 A1* | 7/2020 | Sen | G06F 13/4027 |
| 2021/0373951 A1* | 12/2021 | Malladi | G06F 13/4282 |

OTHER PUBLICATIONS

Margaret Rouse, Double Data Rate Synchronous Dynamic Random-Access Memory, Nov. 10, 2016 (Year: 2016).*
ARM, High-Bandwidth Memory (HBM), 2015 (Year: 2015).*
Bogdan Solta, TSMC and ARM reveal 7 nm high-performance computing interposer chiplet, https://www.notebookcheck.net/TSMC-and-ARM-reveal-7-nm-high-performance-computing-interposer-chiplet.436346.0.html, Oct. 1, 2019 (Year: 2019).*
PCT/EP2021/071342, International Search Report, Sep. 22, 2021, European Patent Office, P.B. 5818 Patentlaan 2, NL-2280 HV Rijswijk.
PCT/EP2021/071342, Written Opinion of the International Searching Authority, Sep. 22, 2021, European Patent Office, P.B. 5818 Patentlaan 2, NL-2280 HV Pays Bas.

* cited by examiner

HIGH-PERFORMANCE COMPUTING SYSTEM

TECHNICAL FIELD

The invention relates to a high-performance computing system that is able to process data and to perform complex calculations at high speeds, namely, today, at least tera ($10^{12}$) calculations per second for a single physical package, a high-performance computing system comprising at least one package. As an example, supercomputers are typically assembled by networking a defined number of high-performance computing systems, said number ranging from a few to thousands.

BACKGROUND

FIG. 1 schematically illustrates a high-performance system architecture. A high-performance computing system HPCAA comprises a chiplet CLAA having a plurality of computational cores C1, C2, C3, C4, a high bandwidth memory HBM and a double data rate synchronous dynamic random-access memory DDR. A first part, generally a main part in terms of number, of the computational cores are used as a computational resource, for example computational cores C1, C2 and C3. As examples, the computational resource runs user codes, manages memories associated with the computational cores, etc. . . . . A second part, generally a minor part in terms of number, of the computational cores may be occasionally (e.g. for a performance purpose) used as a reserved support resource. The reserved support resource executes necessary support functions, like as examples operating system, I/O functionalities, and software monitoring. The support functions may be implemented by the reserved support resource by means of either a spatial reservation or a temporal reservation of at least one computational core. The spatial reservation means that always the same computational core(s) is (are) used, for example always computational core C4. The temporal reservation means that during a time period one (some) computational core(s) among all the computational cores is (are) used, for example computational core C4 during a defined time period. As an example, a high-performance computing system of sixty-eight computational cores may use sixty-four computational cores as a computational resource and four computational cores as a reserved support resource. Such an architecture has numerous economical and technical limitations. Implementing the support functions induces disturbance during the execution of computations. Firstly, concerning the spatial reservation, using even a minor part of computation cores of the high-performance computing system as reserved support resource that could have been used as a computational resource is a waste because a computational core is expensive. Secondly, concerning the temporal reservation, using a computational core as a reserved support resource influences the execution time of computations on the computational cores used as a computational resource. The execution time is affected directly because it will take time to run support functions on the high-performance computing system, thereby causing computational cores executing a computation to wait for the end of the execution of a support function before executing subsequent computations. The execution time is also affected indirectly because of side-effects as for example delays linked to flushing of cache memories, desynchronization of processes, replacement of entries in translation lookaside buffers TLB, internal and external communication mechanisms. Furthermore, using a computational core as a reserved support resource is not efficient in executing support functions because a computational core is optimized for calculation, not for implementing support functions.

SUMMARY OF THE DISCLOSURE

It is an object of the invention to propose a high-performance computing system that overcomes one or more of the limitations of the existing systems, in particular that is structurally simple and reliable to operate.

According to one aspect, there is provided a high-performance computing system comprises:
  at least one computational group of at least one core, each computational group being associated with a computational memory, arranged to form a computational resource being utilized for performing computations;
  a concierge module comprising at least one concierge group of at least one core associated with a concierge memory arranged to form a reserved support resource being utilized for performing support functions to said computational resource;
wherein the computational resource is coupled to the concierge module through a cache coherent interconnection to maintain uniformity of shared resource data that are stored in the computational memory and concierge memory so that the high-performance computing system is functionally transparent to a software code runs on the computational group, and
wherein the cores in the computation and concierge groups are interchangeable for the software code such that said cores are used for performing any one of computations or support functions, and said cores use any one of the computational memory and concierge memory.

The computational memory may be a high bandwidth memory or a hybrid memory cube.

Each core of the computational resource may be interconnected to at least another core of the computational resource.

The concierge memory may be a double data rate synchronous dynamic random-access memory.

The support functions may comprise operating system, In/Out connections functions, and software and user applications monitoring.

The concierge module may comprise supports for slower In/Out connections functions chosen among ethernet, local non-volatile memory express NVMe, serial AT attachment SATA storage, universal serial bus USB, peripheral component interconnect PCI express, connection to a baseboard management controller BMC and a local storage for firmware.

The cache coherent interconnection may be a cache-coherent link.

The concierge module of the reserved support resource may be realized as a concierge die distinct from the cores of the computational resource realized as compute dies.

The concierge module of the reserved support resource and the cores of the computational resource may be realized on a single chiplet.

The concierge module may be implemented in a semiconductor technology that is optimized for reducing power consumption while cores of the computational resource may be implemented in a semiconductor technology that is optimized for high calculation performance.

A single concierge module may serve a defined number ranging from 1 to 2048 of cores of the computational resource.

The system may comprise multiple concierge modules, each concierge module serving a defined number of cores of the computational resource.

Each concierge module serving a defined number of cores of the computational resource may be formed as an independent package, each independent package being coupled to at least one adjacent independent package by an inter-package cache coherent interconnection.

According to another aspect, there is provided a method of operating a high-performance computing system, comprising:
  performing computations operations on a computational resource comprising at least one computational group of at least one core, each computational group being associated with a computational memory;
  performing support functions serving operations of said computational resource on a reserved support resource comprising a concierge module, said concierge module comprising at least one concierge group of at least one core associated with a concierge memory, wherein support functions are performed independently of the computations operations;
  maintaining uniformity of shared resource data stored in computational memory and concierge memory so that the high-performance computing system is functionally transparent to a software code runs on the computational group; and
  defining the cores in the computation and concierge groups as interchangeable for the software code such that said cores are used for performing any one of computations or support functions, and said cores use any one of the computational memory and concierge memory.

Such an architecture is advantageous because:
The functions of the computational cores and of the concierge module are separated so that the performance and cost of each part can be optimized separately, in particular the hardware of the concierge module is tuned for support functions like operating system usage, while the hardware of the computational cores is tuned for "userland" usage;
A standard operating system can be run;
The operating-system memory and buffers (e.g. disk cache) are located in the reserved support resource in association with the concierge module;
The user memory is located in the computational resource in association with the computational cores;
The user software/applications running on the computational resource are unaffected and behave as usual (i.e. no recompilation is necessary); and
All the cores in all the groups (computation group and concierge group) are interchangeable and can be used for any computation or any support function and use any computational memory and concierge memory with no visible difference to the running of the software code other than performance.

Other advantages will become apparent from the hereinafter description of the invention.

DESCRIPTION OF THE DRAWINGS

The present invention is illustrated by way of examples and not limited to the accompanying drawings, in which like references indicate similar elements.

DETAILED DESCRIPTION OF THE INVENTION

Figure 1:
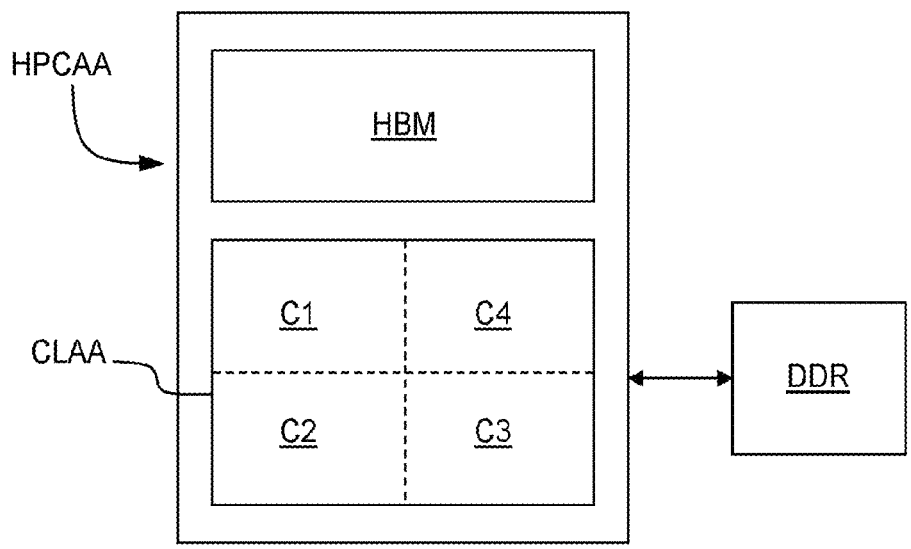
FIG. 1 schematically illustrates a high-performance system architecture according to the prior art.
Figure 2:
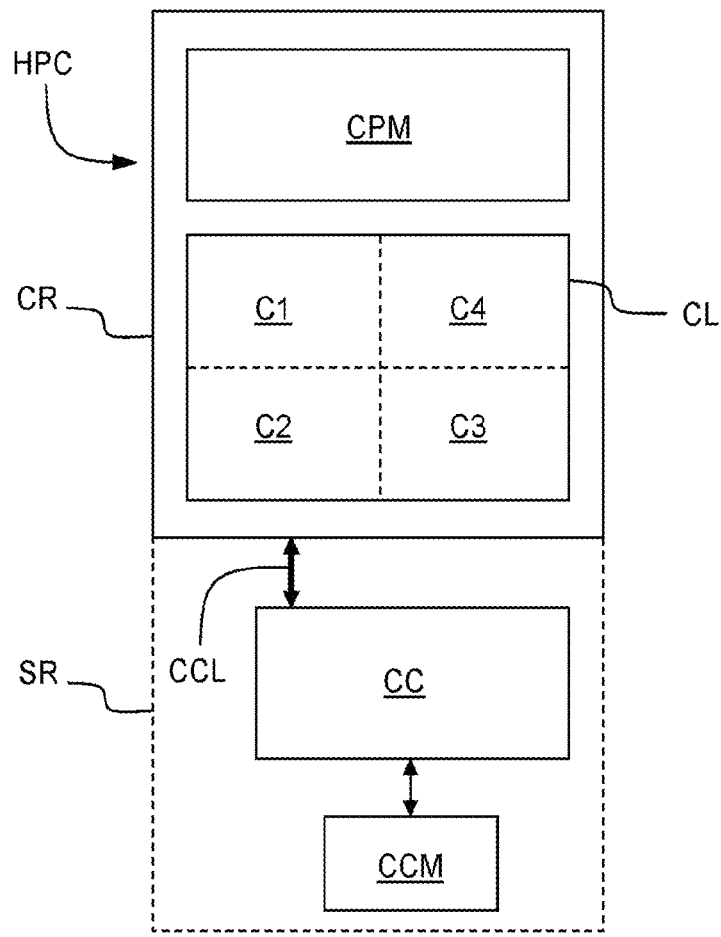
FIG. 2 schematically illustrates a high-performance system architecture according to the invention.

FIG. 2 schematically illustrates a high-performance system architecture of the invention. A high-performance computing system HPC comprises a chiplet CL having a plurality of computational groups C1, C2, C3, C4, each computational group comprises at least one computational core (i.e. a computational group of cores comprises one or more computational core(s)), a computational memory CPM, a concierge module CC and a concierge memory CCM.

According to this architecture, firstly, all the computational groups are used as a computational resource CR, and, secondly, the concierge module CC is used as a reserved support resource SR.

In the illustrated example, the computational resource CR comprises the computational groups C1, C2, C3 and C4. This computational resource CR is mainly used to perform computations (e.g. run user codes), to manage memories associated with the computational cores, and to lock a process on a given computational core. The computational memory CPM is associated with the computational groups C1, C2, C3 and C4. Advantageously, the computational memory CPM may be a high bandwidth memory HBM or hybrid memory cube HMC. In case the performance of the computational memory is not an issue, the computational memory CPM may be a less expensive double data rate synchronous dynamic random-access memory DDR. Thus, the computational resource CR only includes the user-exploitable resources needed for efficient computations, namely a large number of computation cores, computational memory, fast connectors (e.g. on-board interconnect, peripheral component interconnect PCI express), on-package & off-package high-speed link to other computational cores and to the concierge module (e.g. Die-to-Die interconnection, cache coherent interconnect for accelerators protocol CCIX, compute express link CXL) and on-board power management for the computational resource.

The concierge module CC of the reserved support resource SR is used to perform support functions (e.g. operating system, in and out I/O connections functionalities, and software monitoring, etc. . . . ). The concierge module CC comprises at least one concierge group, each concierge group comprises at least one concierge core (i.e. one or more concierge core(s)) specific to the execution of support functions. The concierge memory CCM is associated with the concierge module CC. Thus, the reserved support resource SR only includes the resources required for the support functions: one or small number of cores, a concierge memory CCM, supports for slower I/O functions (e.g. ethernet, local non-volatile memory express NVMe, serial AT attachment SATA storage, universal serial bus USB, peripheral component interconnect PCI express . . . ), connection to a baseboard management controller BMC and a local storage for firmware. Advantageously, the concierge memory CCM may be limited to double data rate synchronous dynamic random-access memory DDR-class memory. In case the performance of the concierge memory is an issue, the concierge memory CPM may be a more expensive memory like high bandwidth memory HBM or hybrid memory cube HMC.

The computational groups C1, C2, C3 and C4 of the computational resource CR and the concierge module CC of the reserved support resource SR are coupled together through a cache coherent interconnection, for example a cache-coherent link CCL. The cache-coherent link CCL is used to maintain the uniformity of shared resource data that are stored in multiple local caches (here the computational memory CPM and the concierge memory CCM). Thus, the computational groups of the computational resource CR and the concierge module CC of the reserved support resource SR use a shared memory space model and are cache coherent with one another. In particular, all of the memory (CPM, CCM), connected to either part (computational resource CR and reserved support resource SR), are available to all cores (computational cores and concierge module), in either part.

As a result, the high-performance system architecture of the invention may be compared to a non-uniform memory access NUMA architecture. The memory access time depends on the memory location relative to the computational core. A computational core can access its own local computational memory CPM faster than non-local memory, namely the concierge memory CCM of the concierge module CC or the computational memory CPM local to another computational core, or even memory shared between multiple computational cores. Each computational core has extremely high bandwidth and low latency to its associated CPM memory. Each computational core has lower bandwidth and higher latency to the CCM memory associated to the concierge module CC. The concierge module CC has good bandwidth and good latency to its associated CCM memory. Further, the concierge module CC has lower bandwidth and higher latency to the CPM memory associated to the computational cores. This NUMA architecture is not affected (in term of programming complexity and performances) because of the clear and distinct respective functions of the concierge module CC on the one hand and of the computational cores on the other hand.

The reserved support resource SR may be either realized as a separate part (i.e. off package or separate chiplet in the same package) of the computational resource CR, or integrated with the computational resource CR on the same complex chiplet (i.e. on package). The concierge module CC may be manufactured according to a semiconductor (e.g. Silicon) technology equivalent, namely with a similar level of performance than the one of the computational cores. However, it may be advantageous to manufacture the concierge module CC according to a semiconductor technology with a different level of performance and cost than the one of the computational cores. The concierge module CC may be characterized by a lower performance in order to be cheaper and to reduce power consumption as compared to the computational cores. As a result, the overall architecture of the invention offers improved trade-offs between cost, performance and power consumption. In particular, the most expensive resources can then be reserved only for the calculation/end-user applications.

The computational cores of the computational resource CR operate independently of the concierge module CC of the reserved support resource SR. In particular, the computational cores of the computational resource CR interact with the computational memory CPM, while the concierge module CC of the reserved support resource SR interacts with the concierge memory CCM. The computational memory CPM may be high bandwidth memory HBM or alternatively hybrid memory cube HMC that is known to be a fast and expensive memory that is reserved to high-performance user code. The concierge memory CCM may be double data rate synchronous dynamic random-access memory DDR that is known to be cheaper and slower than the high bandwidth memory HBM that is reserved to operating system. From the economical point of view, this particular allotment of memories and computational cores results in a less expensive architecture due to the relative costs of reserved support resource SR hardware vs. computational resource CR hardware. From the technical point of view, this results in a more efficient architecture, particularly in term of calculation speed. In particular, an increase of the calculation performance reproducibility is observed because the respective duration necessary to perform calculations by each dedicated computational group C1, C2, C3 and C4 is very similar, and not disturbed by the various operations of the concierge module CC. Further, the computational memory CPM associated with the computational cores is not wasted by the needs of the operating system that is implemented on concierge module CC and that only requires slower memory like the double data rate synchronous dynamic random-access memory DDR. Furthermore, removing the slow memory from the computational resource CR offers additional benefits at a hardware level by decreasing licensing cost (e.g. no DDR controller is involved in the computational resource CR) and reducing the pin counts (e.g. no external memory pin connections).

The computational group C1, C2, C3, C4 and the concierge group CC are homogeneous from the software point of view, meaning that a software code that can be run on one of the cores (or on several cores distributed on one or more groups) can also be run on any other core (or on several other cores distributed on one or more groups). The only difference is that the performance may vary depending on the core(s) used, but functionally all the cores are interchangeable for the software code. The separation of cores and memories between the computational resource CR and the reserved support resource SR is useful for performance, but is not necessary for the proper operation of the high-performance computing system. This means that an operating system which does not know the existence of the concierge architecture will be able to operate normally but with a potentially reduced level of performance compared to an optimal use of the concierge architecture.

FIGS. 3 to 8 show various combinations of dies using a single (FIGS. 3 to 6 and 8) or multiple (FIG. 7), and separate concierge die. In the following, a die means a part of semiconducting material on which a given functional circuit is fabricated in order to form an integrated circuit. In these examples, either a single concierge module serves or multiple concierge modules serve a variable number of computational cores. These may include a variable number of physical packages each with a variable number of chips, like multi-chips modules MCM and multi-chips packages.

Figure 3:
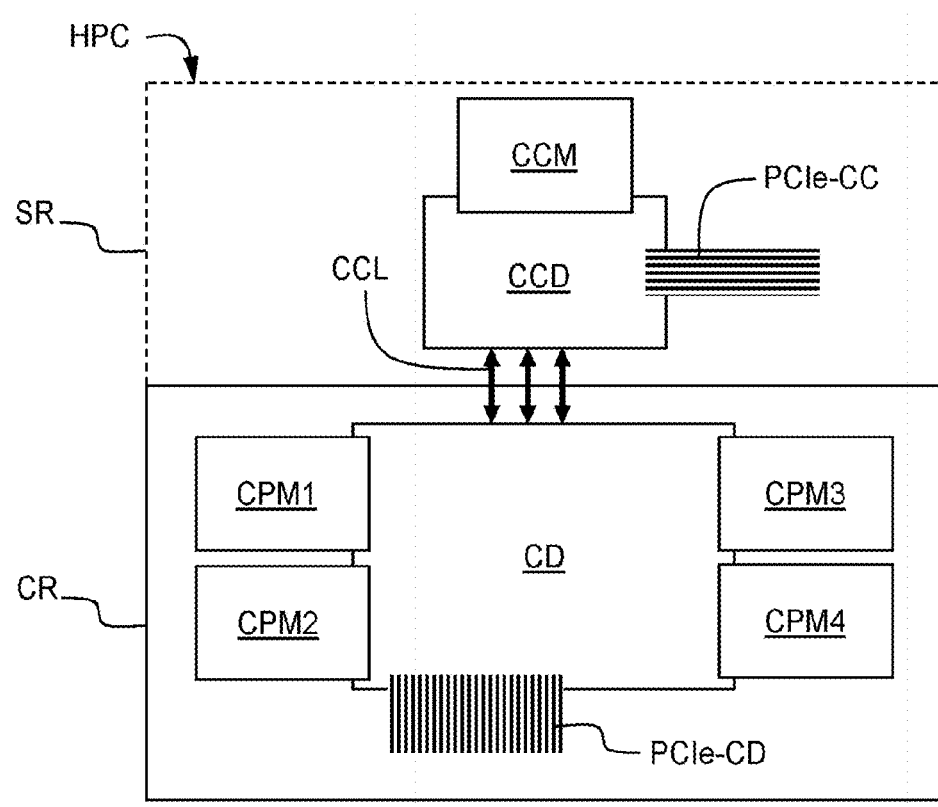
FIGS. 3 to 8 are block diagrams schematically illustrating six embodiments based on the high-performance system architecture of the invention comprising one, two, four, alternate four, eight and alternate eight compute dies, respectively.

FIG. 3 schematically illustrates a first embodiment based on the high-performance system architecture of the invention comprising one compute die CD and one concierge die CCD.

The computational resource CR comprises one compute die constituting one or more computational group(s) of at least one core CD being coupled with multiple computational memory CPM1, CPM2, CPM3, CPM4, and having a peripheral component interconnect PCI express PCIe-CD and a reserved support resource connection. The PCI express is a high-speed serial bus, constituting an interface for graphics cards, storage devices like hard disk drives and solid-state drives SSD, and connections like wireless fidelity Wi-Fi and ethernet. The PCI express is characterized by the number of lanes, for example forty-eight lanes for the computational resource CR. The PCI express is standardized by the known PCI special interest group PCI-SIG.

The reserved support resource SR comprises one concierge die constituting a concierge module (i.e. at least one concierge group of at least one core) CCD being coupled with a concierge memory CCM, and having a peripheral component interconnect PCI express PCIe-CC and a computational resource connection. The computational resource connection of the concierge die is coupled to the reserved support resource connection of the compute die by the specific cache-coherent link CCL. The peripheral component interconnect PCI express PCIe-CC of the reserved support resource SR may only comprise a few lanes, for examples four lanes.

Figure 4:
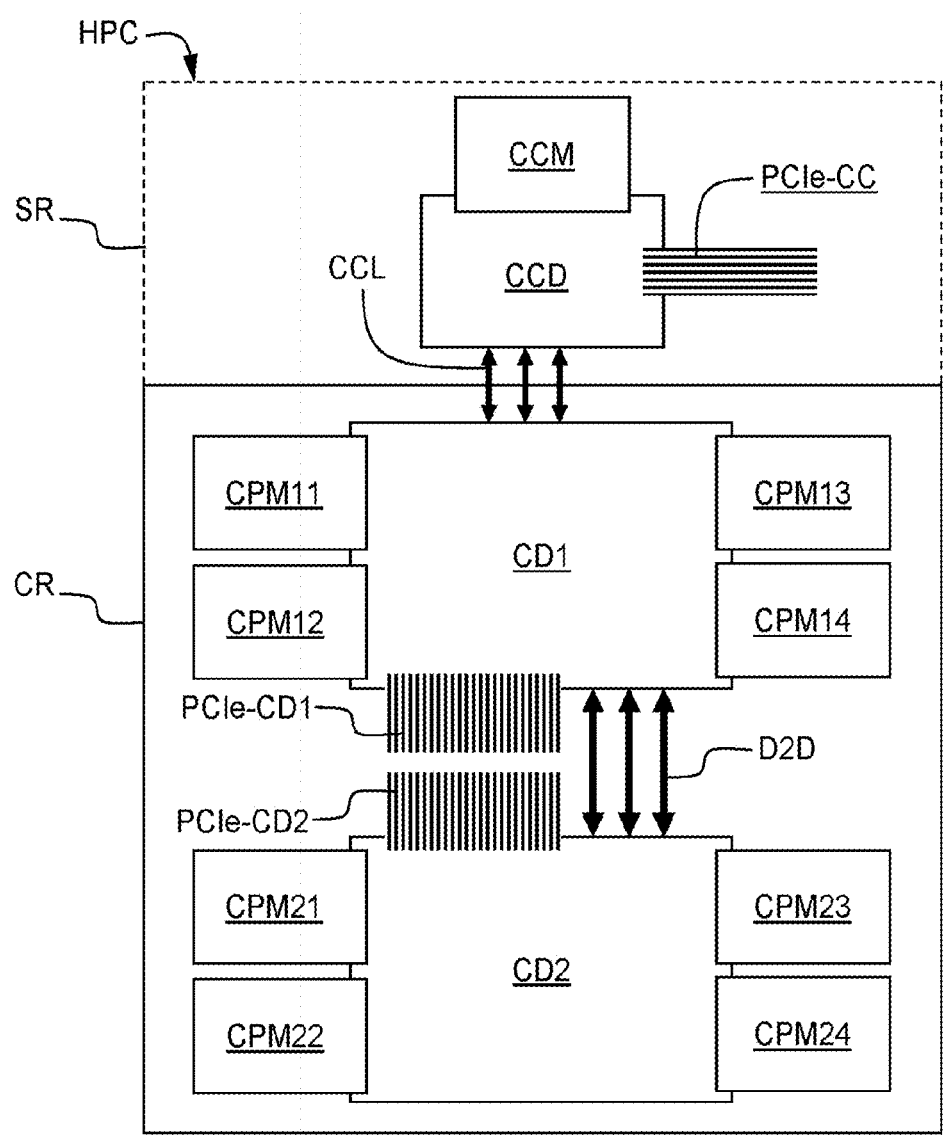

FIG. 4 schematically illustrates a second embodiment based on the high-performance system architecture of the invention comprising two compute dies.

The computational resource CR comprises two compute dies constituting a first computational group of at least one core CD1 being coupled with multiple computational memory CPM11, CPM12, CPM13, CPM14 and a second computational group of at least one core CD2 being coupled with multiple computational memory CPM21, CPM22, CPM23, CPM24, each having a peripheral component interconnect PCI express PCIe-CD1, PCIe-CD2 respectively and a die-to-die connection D2D. The first computational group of at least one core CD1 comprises a reserved support resource connection identical to the one of FIG. 3. Each peripheral component interconnect PCI express PCIe-CD1, PCIe-CD2 PCI express may for example comprise forty-eight lanes. The die-to-die connection D2D couples the first computational group of at least one core CD1 to the second computational group of at least one core CD2.

The reserved support resource SR is identical to the one of FIG. 3. It is only connected to the first computational group of at least one core CD1.

Figure 5:
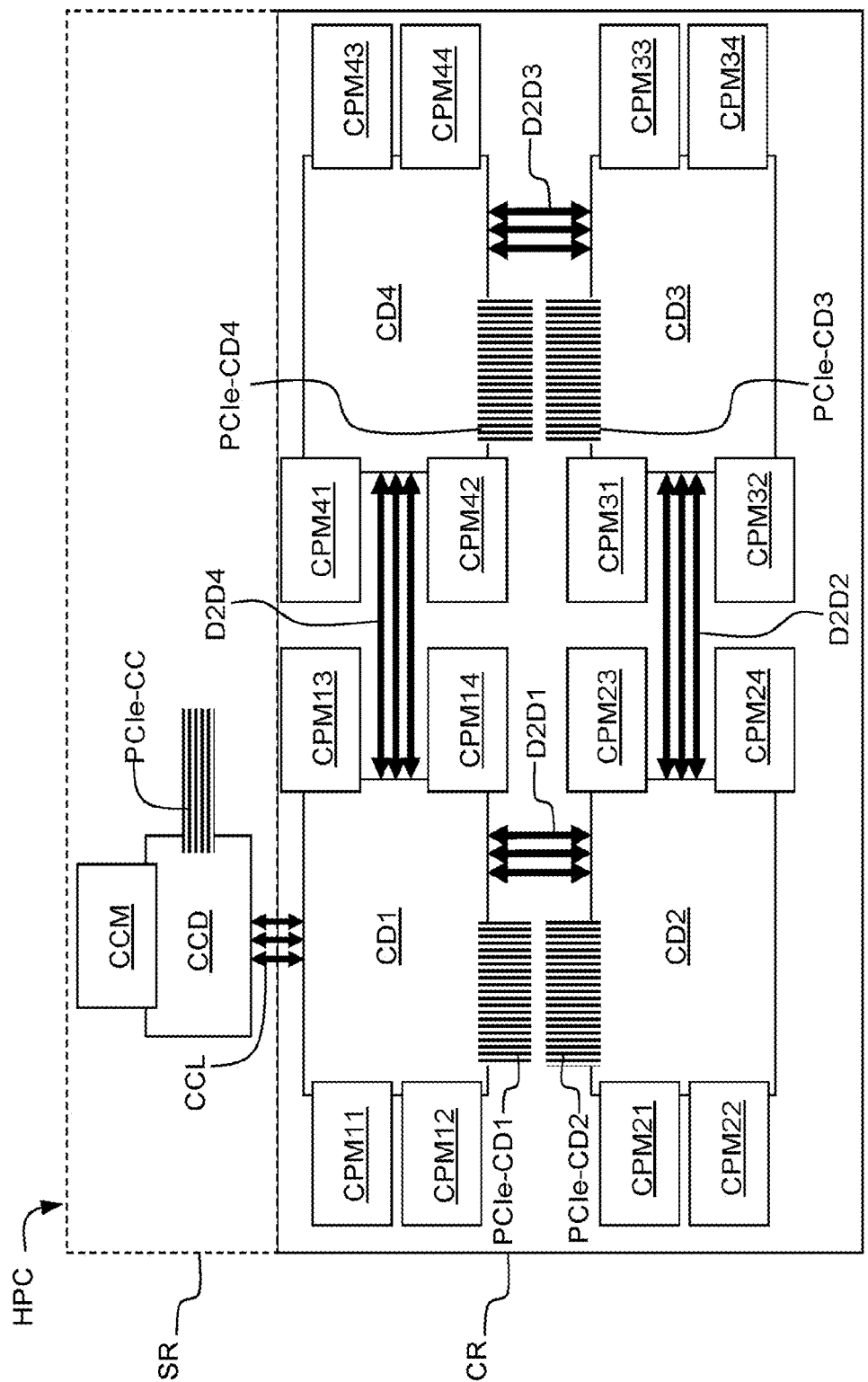

FIG. 5 schematically illustrates a third embodiment based on the high-performance system architecture of the invention comprising four compute dies.

The computational resource CR comprises four compute dies constituting a first computational group of at least one core CD1 being coupled with multiple computational memory CPM11, CPM12, CPM13, CPM14, a second computational group of at least one core CD2 being coupled with multiple computational memory CPM21, CPM22, CPM23, CPM24, a third computational group of at least one core CD3 being coupled with multiple computational memory CPM31, CPM32, CPM33, CPM34 and a fourth computational group of at least one core CD4 being coupled with multiple computational memory CPM41, CPM42, CPM43, CPM44, each having a peripheral component interconnect PCI express PCIe-CD1, PCIe-CD2, PCIe-CD3 and PCIe-CD4 respectively and multiple die-to-die connection D2D1, D2D2, D2D3 and D2D4. The first computational group of at least one core CD1 comprises a reserved support resource connection identical to the one of FIG. 3. Each peripheral component interconnect PCI express PCIe-CD1, PCIe-CD2, PCIe-CD3 and PCIe-CD4 PCI express may for example comprise forty-eight lanes. The first die-to-die connection D2D1 couples the first computational group of at least one core CD1 to the second computational group of at least one core CD2. The second die-to-die connection D2D2 couples the second computational group of at least one core CD2 to the third computational group of at least one core CD3. The third die-to-die connection D2D3 couples the third computational group of at least one core CD3 to the fourth computational group of at least one core CD4. The fourth die-to-die connection D2D4 couples the first computational group of at least one core CD1 to the fourth computational group of at least one core CD4.

The reserved support resource SR is identical to the one of FIG. 3. It is only connected to the first computational group of at least one core CD1.

With this exemplary embodiment comprising four compute dies, it is to be noted that one concierge module CC is sufficient to implement the support functions, whatever the number of computational cores in the computational resource CR. As a result, it avoids having a linear increase in support functions cost with the number of compute dies compared to an architecture wherein the support functions are included in the computational resource CR as in the prior art.

Figure 6:
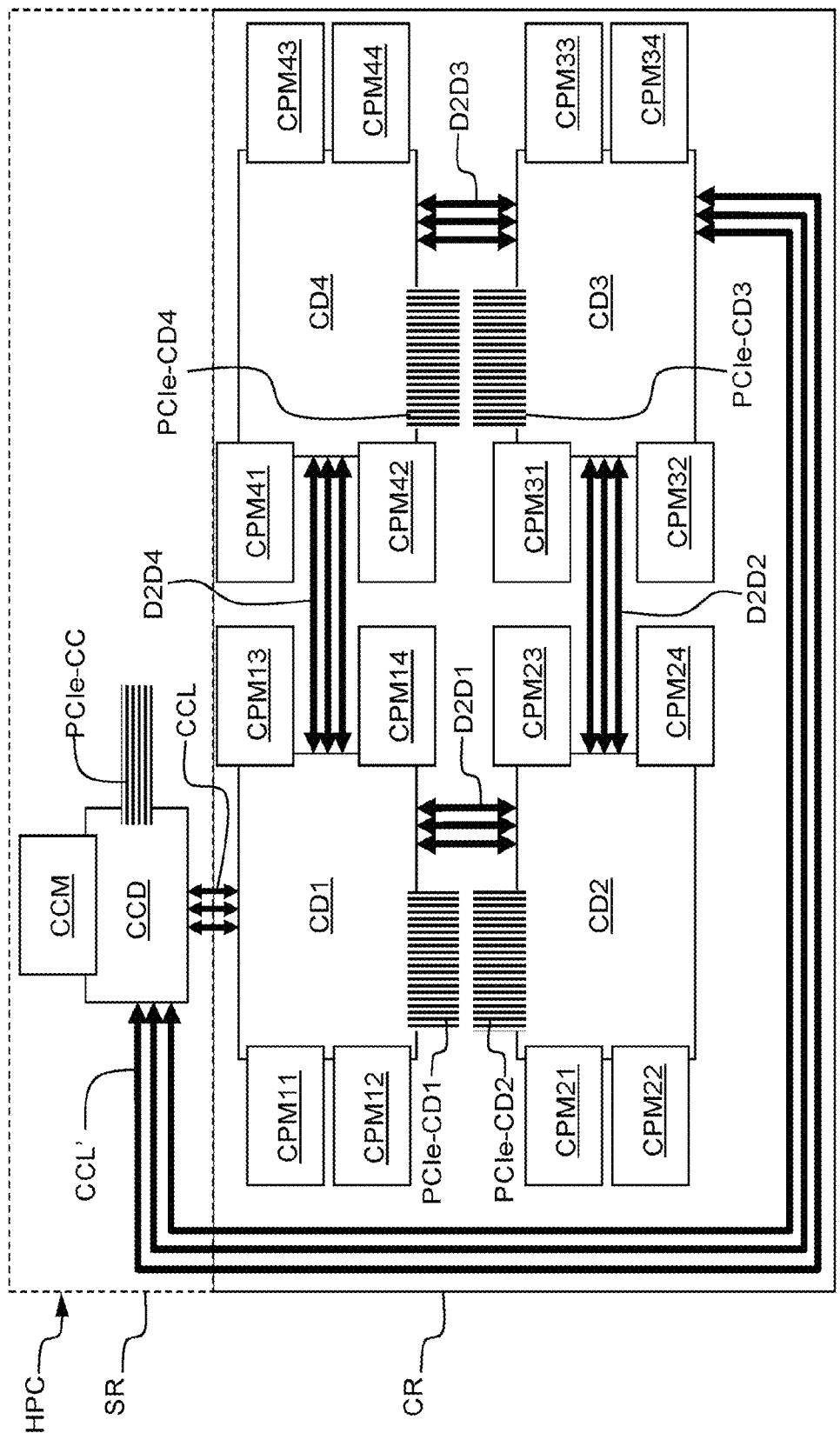

FIG. 6 schematically illustrates a fourth embodiment based on the high-performance system architecture of the invention comprising four compute dies. The computational resource CR and the reserved support resource SR are identical to the one of FIG. 5. However, the fourth embodiment differs from the third embodiment in that it further comprises a second cache coherent interconnection. Thus, the concierge die is coupled to the compute die by two specific cache-coherent links CCL and CLL'. In this particular example, the first computational group of at least one core CD1 is connected to the concierge module CCD through the first cache-coherent link CCL and the third computational group of at least one core CD3 is connected to the concierge module CCD through the second cache-coherent link CCL'.

With this exemplary embodiment comprising an additional connection between the compute dies and the concierge module, the path between the farthermost computational core is reduced. This avoids the farthermost computational group of at least one core to pass through computational group of at least one core in intermediate positions to obtain support functions.

Figure 7:
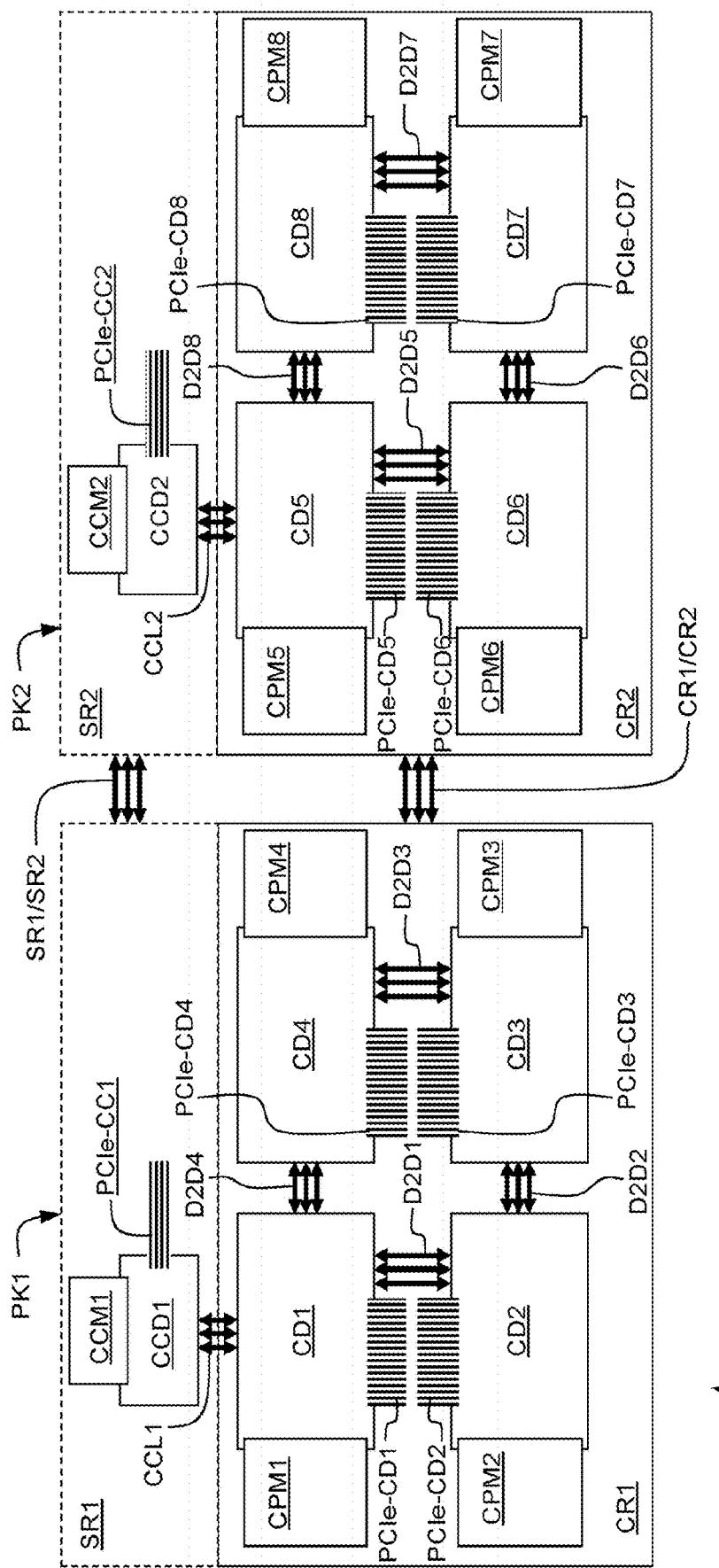

FIG. 7 schematically illustrates a fifth embodiment based on the high-performance system architecture of the invention comprising eight compute dies in a multi-packages arrangement. In this example, two concierge modules are provided, each serving a defined number of computational groups of at least one core. Each unit comprising the defined number of computational groups of at least one core and the associated concierge module is implemented as a separate multi-chips package. A first package PK1 comprises a first computational resource CR1 and a first reserved support resource SR1. A second package PK2 comprises a second computational resource CR2 and a second reserved support resource SR2. Together, the first computational resource CR1 and the second computational resource CR2 form the computational resource CR. Together, the first reserved support resource SR1 and the second reserved support resource SR2 form the reserved support resource SR. Obviously, multi-packages arrangement is not limited to this particular embodiment showing two adjacent independent packages as more packages may be provided depending on the number of computational groups of at least one core and number of concierge modules involved in the considered high-performance system.

The first computational resource CR1 comprises four compute dies constituting a first computational group of at least one core CD1 being coupled with computational memory CPM1, a second computational group of at least one core CD2 being coupled with computational memory CPM2, a third computational group of at least one core CD3 being coupled with computational memory CPM3 and a fourth computational group of at least one core CD4 being coupled with computational memory CPM4, each having a peripheral component interconnect PCI express PCIe-CD1, PCIe-CD2, PCIe-CD3 and PCIe-CD4 respectively and multiple die-to-die connection D2D1, D2D2, D2D3 and D2D4. The first computational group of at least one core CD1 comprises a reserved support resource connection identical to the one of FIG. 3. The first die-to-die connection D2D1 couples the first computational group of at least one core CD1 to the second computational group of at least one core CD2. The second die-to-die connection D2D2 couples the second computational group of at least one core CD2 to the third computational group of at least one core CD3. The third die-to-die connection D2D3 couples the third computational group of at least one core CD3 to the fourth computational group of at least one core CD4. The fourth die-to-die connection D2D4 couples the first computational group of at least one core CD1 to the fourth computational group of at least one core CD4.

The first reserved support resource SR1 comprises one concierge die constituting a first concierge module CCD1 being coupled with a first concierge memory CCM1, and having a peripheral component interconnect PCI express PCIe-CC1 and a computational resource connection. The computational resource connection of the first concierge die CCD1 may be coupled to the reserved support resource connection of the first compute die CD1 by a first cache-coherent link CCL1.

The second computational resource CR2 comprises four compute dies constituting a fifth computational group of at least one core CD5 being coupled with computational memory CPM5, a sixth computational group of at least one core CD6 being coupled with computational memory CPM6, a seventh computational group of at least one core CD7 being coupled with computational memory CPM7 and a eighth computational group of at least one core CD8 being coupled with computational memory CPM8, each having a peripheral component interconnect PCI express PCIe-CD5, PCIe-CD6, PCIe-CD7 and PCIe-CD8 respectively and multiple die-to-die connection D2D5, D2D6, D2D7 and D2D8. The fifth computational group of at least one core CD5 comprises a reserved support resource connection identical to the one of FIG. 3. The fifth die-to-die connection D2D5 couples the fifth computational group of at least one core CD5 to the sixth computational group of at least one core CD6.

The sixth die-to-die connection D2D6 couples the sixth computational group of at least one core CD6 to the seventh computational group of at least one core CD7. The seventh die-to-die connection D2D7 couples the seventh computational group of at least one core CD7 to the eighth computational group of at least one core CD8. The eight die-to-die connection D2D8 couples the fifth computational group of at least one core CD5 to the eighth computational group of at least one core CD8.

The second reserved support resource SR2 comprises one concierge die constituting a second concierge module CCD2 being coupled with a second concierge memory CCM2, and having a peripheral component interconnect PCI express PCIe-CC2 and a computational resource connection. The computational resource connection of the second concierge die CCD2 may be coupled to the reserved support resource connection of the fifth compute die CD5 by a second cache-coherent link CCL2.

The peripheral component interconnect PCI express PCIe-CC1 and PCIe-CC2 of the first and second concierge modules CCD1, CCD2 may only comprise a few lanes, for examples four lanes. Each peripheral component interconnect PCI express PCIe-CD1, PCIe-CD2, PCIe-CD3, PCIe-CD4, PCIe-CD5, PCIe-CD6, PCIe-CD7 and PCIe-CD8 of the respective computational group of at least one core CD1, CD2, CD3, CD4, CD5, CD6, CD7 and CD8 may for example comprise forty-eight lanes.

The first computational resource CR1 of the first package PK1 is connected to the second computational resource CR2 of the second package PK2 by means of a first inter-package cache-coherent link CR1/CR2. The first reserved support resource SR1 of the first package PK1 is connected to the second reserved support resource SR2 of the second package PK2 by means of a second inter-package cache-coherent link SR1/SR2.

Figure 8:
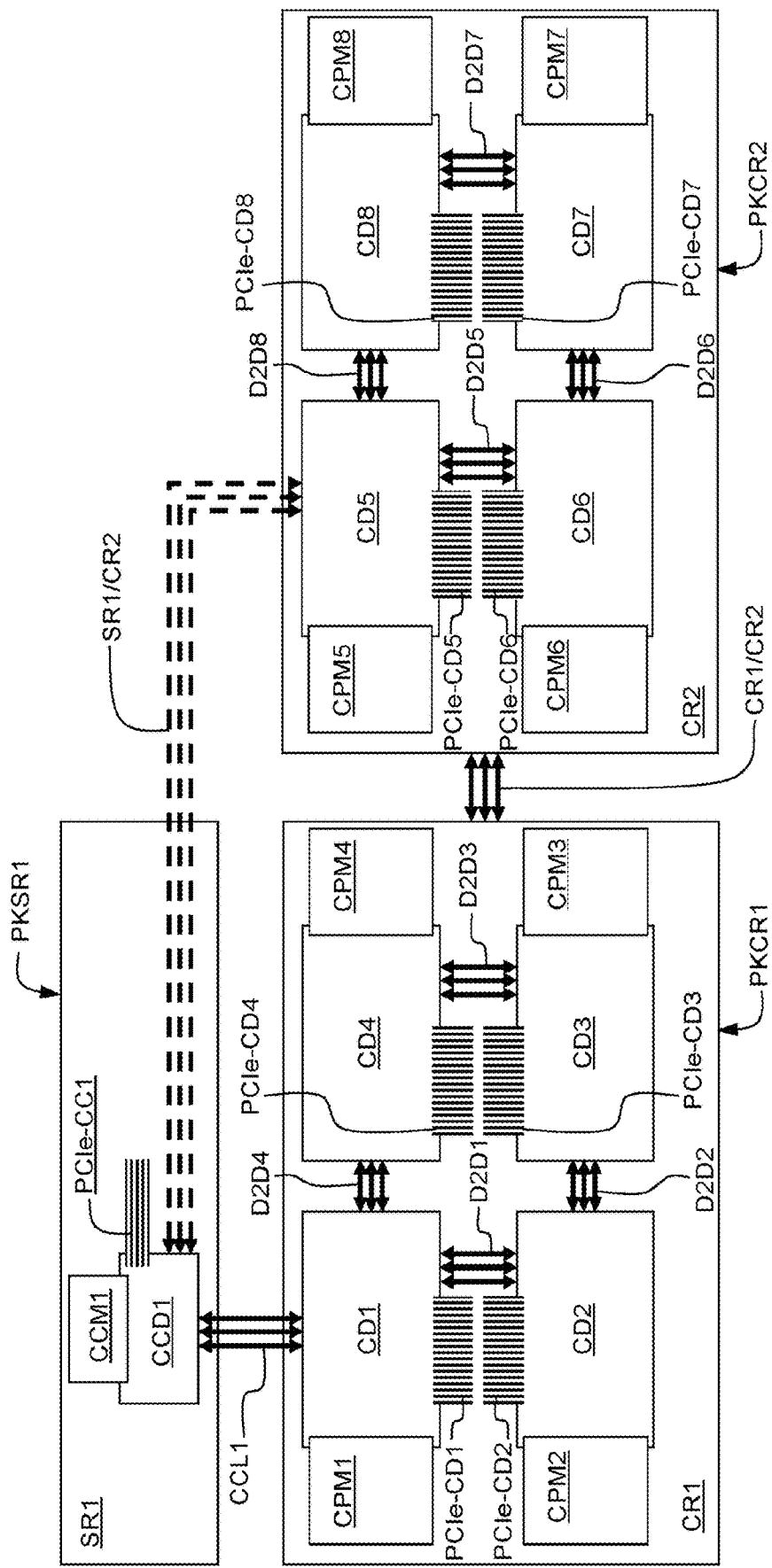

FIG. 8 schematically illustrates a sixth embodiment based on the high-performance system architecture of the invention comprising eight compute dies of the fifth embodiment illustrated in FIG. 7 in a multi-packages arrangement. This embodiment differs from the fifth embodiment in that a single concierge module in a separate package is provided. In this exemplary embodiment, a single concierge module CCD1 is provided that serves all the computational groups of at least one core CD1-CD8. Each unit comprising a defined number of computational cores and the associated concierge module are implemented as separate multi-chips packages. A first package PKCR1 constitutes a first computational resource CR1. A second package PKCR2 constitutes a second computational resource CR2. A third package PKSR1 constitutes a single reserved support resource SR1. Together, the first computational resource CR1 and the second computational resource CR2 form the computational resource CR. The single reserved support resource SR1 serves both the first computational resource CR1 and the second computational resource CR2. The first computational resource CR1 of the first package PKCR1 is connected to the second computational resource CR2 of the second package PKCR2 by means of a first inter-package cache-coherent link CR1/CR2. The first computational resource CR1 of the first package PKCR1 is connected to the first reserved support resource SR1 of the third package PKSR1 by means of a first cache-coherent link CCL1. The second computational resource CR2 of the second package PKCR2 is connected to the first reserved support resource SR1 of the third package PKSR1 through the first computational resource CR1 of the first package PKCR1 by means of the first inter-package cache-coherent link CR1/CR2. Alternatively, the second computational resource CR2 of the second package PKCR2 is connected to the first reserved support resource SR1 of the third package PKSR1 by means of a second inter-package cache-coherent link SR1/CR2 (illustrated as broken lines).

A multi-packages arrangement is a way to avoid issues regarding thermal dissipation, calculation performance enhancement, cost increase, etc., For example, a multi-packages arrangement enables avoiding any technical limitation related to the capacity of the high-performance system to dissipate heat generated during high-performance system operation, or enhancing the calculation performance of a super computer without increasing a size of a single package arrangement, etc. . . . .

The high-performance system architecture according to the invention enables maximizing performance of the codes by:

implementing as many threads/processes of execution as there are computational cores;

tuning the codes to maximize the performance per computational core, such as vectorization, cache blocking, software pipelining, etc. . . . ;

exploiting the memory hierarchy and the available memory bandwidth to the fullest;

locking a thread/process on a given computational core while avoiding unwanted side-effect, such as cache flushing and reloading.

With the high-performance system architecture of the invention, it may also be possible to run a standard operating system almost exclusively on the concierge module. Almost exclusively means that only the per-computational core required part of the standard operating system like idle threads is run on the computational cores.

Further, the user-required part of the operating system like the interconnect driver are run on the computational cores.

The user code is almost exclusively run on the computational cores. Almost exclusively means that only the less commonly used system calls are run on the concierge module.

Once a user software is attributed to the computational cores and memory by the operating system and resource manager, then the user software behaves as usual. Thus, programming on the high-performance system architecture of the invention does not require particular skills from the end-user perspective compared to prior art architecture programming.

Thus, with this architecture, applications can maximize their uses of the computational cores with no interference from the operating system, at a lower cost and higher performance than the prior art architecture consisting in a mere isolation or a forced depopulation of a defined number of computational cores from the total number of computational cores in order to effect support functions.

The high-performance computing system of the present invention finds applications in various industry domains, for example processors engineering and manufacturing industry, computer workstations industry, supercomputing industry, automotive industry (e.g. for autonomous driving, connected car), etc. . . . .

It should be appreciated that embodiments of the high performance computing system of the present invention are not limited to the embodiments showing one, two, four or eight compute dies, the invention being also applicable whatever the configuration of the HPC system, namely other quantity of compute dies, for example 64 compute dies, 128 compute dies, etc. . . . Further, the embodiments of the high performance computing system of the present invention are not limited to the embodiments showing one or two packages, the invention being also applicable whatever the configuration of the HPC system in term of packages.

The invention claimed is:

1. A high-performance computing system that processes data and performs complex calculations at, at least, tera calculations per second, comprises:

at least one computational group of at least one core, each computational group being associated with a computational memory, arranged to form a computational resource being utilized for performing computations, said computational memory being a high bandwidth memory or a hybrid memory cube or a double data rate synchronous dynamic random-access memory;

a concierge module comprising at least one concierge group of at least one core associated with a concierge memory arranged to form a reserved support resource being utilized for performing support functions to said computational resource, said concierge memory being a double data rate synchronous dynamic random-access memory or a high bandwidth memory or a hybrid memory cube, wherein support functions comprises operating system, In/Out connections functions, and software and user applications monitoring;

wherein the computational resource is coupled to the concierge module through a cache coherent interconnection to maintain uniformity of shared resource data that are stored in the computational memory and concierge memory, wherein the, at least one, core in the, at least one, computational group and the, at least one, core in the, at least one, concierge group are interchangeable for software codes such that said cores are used for performing any one of computations or support functions, and said cores use any one of the computational memory and concierge memory, and wherein accesses to the computational memory and to the concierge memory are not homogeneous, in terms of performances, across the cores of the computational group relative to the cores of the concierge group.

2. The high-performance computing system of claim 1, wherein each core of the computational resource is interconnected to at least another core of the computational resource.

3. The high-performance computing system of claim 1, wherein the concierge module comprises supports for slower In/Out connections functions chosen among ethernet, local non-volatile memory express NVMe, serial AT attachment SATA storage, universal serial bus USB, peripheral component interconnect PCI express, connection to a baseboard management controller BMC and a local storage for firmware.

4. The high-performance computing system of claim 1, wherein the cache coherent interconnection is a cache-coherent link.

5. The high-performance computing system of claim 1, wherein the concierge module of the reserved support resource is realized as a concierge die distinct from the cores of the computational resource realized as compute dies.

6. The high-performance computing system of claim 1, wherein the concierge module of the reserved support resource and the cores of the computational resource are realized on a single chiplet.

7. The high-performance computing system of claim 1, wherein the concierge module is implemented in a semiconductor technology that is optimized for reducing power consumption while cores of the computational resource are implemented in a semiconductor technology that is optimized for high calculation performance.

8. The high-performance computing system of claim 1, wherein a single concierge module serves a defined number ranging from 1 to 2048 of cores of the computational resource.

9. The high-performance computing system of claim 1, wherein the system comprises multiple concierge modules, each concierge module serving a defined number of cores of the computational resource.

10. The high-performance computing system of claim 9, wherein each concierge module serving a defined number of cores of the computational resource are formed as an independent package, each independent package being coupled to at least one adjacent independent package by an inter-package cache coherent interconnection.

11. A method of operating a high-performance computing system that processes data and performs complex calculations at, at least, tera calculations per second, comprising:

performing computations operations on a computational resource comprising at least one computational group of at least one core, each computational group being associated with a computational memory, said computational memory being a high bandwidth memory or a hybrid memory cube or a double data rate synchronous dynamic random-access memory;

performing support functions serving operations of said computational resource on a reserved support resource comprising a concierge module, said concierge module comprising at least one concierge group of at least one core associated with a concierge memory, wherein support functions are performed independently of the computations operations, said concierge memory being a double data rate synchronous dynamic random-access memory or a high bandwidth memory or a hybrid memory cube, wherein support functions comprises operating system, In/Out connections functions, and software and user applications monitoring;

maintaining uniformity of shared resource data stored in computational memory and concierge memory;

defining the, at least one, core in the, at least one, computational group and the, at least one, core in the, at least one, concierge group as interchangeable for software codes such that said cores are used for performing any one of computations or support functions, and said cores use any one of the computational memory and concierge memory; and accessing said memories such that the computational memory and the concierge memory are not homogeneous, in terms of performances, across the cores of the computational group relative to the cores of the concierge group.

* * * * *